United States Patent
Li et al.

(10) Patent No.: US 11,086,072 B2
(45) Date of Patent: Aug. 10, 2021

(54) BACKLIGHT MODULE AND DISPLAY APPARATUS

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Mengjie Li, Beijing (CN); Kaiwen Wang, Beijing (CN); Haifeng Xu, Beijing (CN); Hui Dong, Beijing (CN); Aixia Sang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/999,382

(22) Filed: Aug. 21, 2020

(65) Prior Publication Data

US 2021/0191034 A1    Jun. 24, 2021

(30) Foreign Application Priority Data

Dec. 19, 2019 (CN) .......................... 201911318902.9

(51) Int. Cl.
*F21V 8/00* (2006.01)
*B60K 35/00* (2006.01)

(52) U.S. Cl.
CPC ............ *G02B 6/0088* (2013.01); *B60K 35/00* (2013.01); *G02B 6/0051* (2013.01); *G02B 6/0053* (2013.01); *B60K 2370/152* (2019.05); *B60K 2370/336* (2019.05)

(58) Field of Classification Search
CPC .. G02B 6/0088; G02B 6/0053; G02B 6/0051; B60K 35/00; B60K 2370/336; B60K 2370/152
See application file for complete search history.

(56) References Cited

U.S. PATENT DOCUMENTS

| | | | | |
|---|---|---|---|---|
| 9,897,293 | B2* | 2/2018 | Xu | F21V 17/164 |
| 10,047,933 | B2* | 8/2018 | Zhang | G02F 1/133608 |
| 10,268,073 | B2* | 4/2019 | Wu | G02B 6/0081 |
| 10,309,622 | B2* | 6/2019 | Xu | H05K 1/18 |
| 2006/0028836 | A1* | 2/2006 | Shin | G02B 6/009 362/600 |
| 2016/0147005 | A1* | 5/2016 | Sasaki | G02B 6/0031 349/65 |
| 2020/0333665 | A1* | 10/2020 | Hu | G02B 6/0088 |

* cited by examiner

*Primary Examiner* — Tracie Y Green
(74) *Attorney, Agent, or Firm* — Dilworth & Barrese, LLP.; Michael J. Musella, Esq

(57) ABSTRACT

A backlight module and a display apparatus are provided. The backlight module includes a film sheet, including a first opening and a second opening; and a light guide plate, including a first limit boss located within the first opening and a second limit boss located within the second opening. The second limit boss limits a position of the film sheet in a first direction; the first limit boss limits the position of the film sheet in a second direction. In the second direction, a first interval between is between a portion of the film sheet that forms the second opening and the second limit boss; and the portion of the film sheet that forms the second opening includes two first sidewalls opposite to each other in the first direction.

20 Claims, 9 Drawing Sheets

BACKLIGHT MODULE AND DISPLAY APPARATUS

CROSS-REFERENCE TO RELATED APPLICATIONS

For all purposes under the U.S. law, the present application claims priority of Chinese Patent Application No. 201911318902.9 filed on Dec. 19, 2019, the disclosure of which is incorporated herein by reference in its entirety as part of the present application.

TECHNICAL FIELD

At least one embodiment of the present disclosure relates to a backlight module and a display apparatus.

BACKGROUND

A liquid crystal display apparatus usually includes a backlight module and a display screen; and the backlight module supplies backlight to the display screen.

SUMMARY

At least one of the embodiments of the present disclosure provides a backlight module including: a film sheet, including a first opening and a second opening; and a light guide plate, including a main body portion, the main body portion including a main surface; the light guide plate further includes a first limit boss and a second limit boss located on a side of the main body portion on which the main surface is located; the first limit boss is located within the first opening; and the second limit boss is located within the second opening; the second limit boss limits a position of the film sheet in a first direction; the first limit boss limits the position of the film sheet in a second direction; the first direction and the second direction are both directions parallel to the main surface; and the first direction intersects with the second direction; in the second direction, a first interval between is between a portion of the film sheet that forms the second opening and the second limit boss; and the portion of the film sheet that forms the second opening includes two first sidewalls opposite to each other in the first direction; a first gap and a second gap are respectively between the second limit boss and the two first sidewalls; a size of the first interval in the second direction is greater than a size of the first gap in the first direction; the size of the first interval in the second direction is greater than a size of the second gap in the first direction; or the second limit boss is in contact with the two first sidewalls.

According to the backlight module provided by one or more embodiments of the present disclosure, in the first direction, an interval is between a portion of the film sheet that forms the first opening and the first limit boss; and the portion of the film sheet that forms the first opening includes two sidewalls opposite to each other in the second direction; a third gap and a fourth gap are respectively between the first limit boss and the two sidewalls; a size of the interval in the first direction is greater than a size of the third gap in the second direction; the size of the interval in the first direction is greater than a size of the fourth gap in the second direction; or, the first limit boss is in contact with the two sidewalls.

According to the backlight module provided by one or more embodiments of the present disclosure, the size of the interval in the first direction is at least 2.6 times the size of the third gap in the second direction; and the size of the interval in the first direction is at least 2.6 times the size of the fourth gap in the second direction; the size of the first interval in the second direction is at least 2.6 times the size of the first gap in the first direction; and the size of the first interval in the second direction is at least 2.6 times the size of the second gap in the first direction.

According to the backlight module provided by one or more embodiments of the present disclosure, the size of the first gap in the first direction is less than or equal to 0.15 mm; the size of the second gap in the first direction is less than or equal to 0.15 mm; and the size of the first interval in the second direction is greater than or equal to 0.4 mm; the size of the third gap in the second direction is less than or equal to 0.15 mm; the size of the fourth gap in the second direction is less than or equal to 0.15 mm; and the size of the interval in the first direction is greater than or equal to 0.4 mm.

According to the backlight module provided by one or more embodiments of the present disclosure, an outer surface of the first limit boss is in contact with the portion of the film sheet that forms the first opening in at least one of the first direction and the second direction.

According to the backlight module provided by one or more embodiments of the present disclosure, the light guide plate further includes a third limit boss located on the side of the main body portion on which the main surface is located; the film sheet further includes a third opening; the third limit boss is located within the third opening; and the third limit boss limits the position of the film sheet in the second direction; in the first direction, a second interval is between a portion of the film sheet that forms the third opening and the third limit boss; and the portion of the film sheet that forms the third opening includes two second sidewalls opposite to each other in the second direction, and a fifth gap and a sixth gap are respectively between the third limit boss and the two second sidewalls; a size of the second interval in the first direction is greater than a size of the fifth gap in the second direction; the size of the second interval in the first direction is greater than a size of the sixth gap in the second direction; or, the third limit boss is in contact with the two second sidewalls.

According to the backlight module provided by one or more embodiments of the present disclosure, the size of the second interval in the first direction is at least 2.6 times the size of the fifth gap in the second direction; and the size of the second interval in the first direction is at least 2.6 times the size of the sixth gap in the second direction.

According to the backlight module provided by one or more embodiments of the present disclosure, the size of the fifth gap in the second direction is less than or equal to 0.15 mm; the size of the sixth gap in the second direction is less than or equal to 0.15 mm; and the size of the second interval in the first direction is greater than or equal to 0.4 mm.

According to the backlight module provided by one or more embodiments of the present disclosure, the light guide plate further includes a third limit boss located on the side of the main body portion on which the main surface is located; the film sheet further includes a third opening; the third limit boss is located within the third opening; and the third limit boss limits the position of the film sheet in the first direction; in the second direction, a second interval is between a portion of the film sheet that forms the third opening and the third limit boss; the portion of the film sheet that forms the third opening includes two second sidewalls opposite to each other in the first direction, and a fifth gap and a sixth gap are respectively between the third limit boss and the two second sidewalls; a size of the second interval in the second direction is greater than a size of the fifth gap in the first direction; and the size of the second interval in the second direction is greater than a size of the sixth gap in the first direction.

According to the backlight module provided by one or more embodiments of the present disclosure, the size of the second interval in the second direction is at least 2.6 times the size of the fifth gap in the first direction; and the size of the second interval in the second direction is at least 2.6 times the size of the sixth gap in the first direction.

According to the backlight module provided by one or more embodiments of the present disclosure, the size of the fifth gap in the first direction is less than or equal to 0.15 mm; the size of the sixth gap in the first direction is less than or equal to 0.15 mm; and the size of the second interval in the second direction is greater than or equal to 0.4 mm.

According to the backlight module provided by one or more embodiments of the present disclosure, the first limit boss, the second limit boss, and the third limit boss are located on a same side edge of the light guide plate.

According to the backlight module provided by one or more embodiments of the present disclosure, the first limit boss is located between the second limit boss and the third limit boss; and the first limit boss is located on a side of connecting line of centers of the second limit boss and the third limit boss that is away from a center of the light guide plate.

According to the backlight module provided by one or more embodiments of the present disclosure, one of the first opening, the second opening, and the third opening is a through hole or a notch.

According to the backlight module provided by one or more embodiments of the present disclosure, the backlight module further includes a single-sided adhesive, wherein, the single-sided adhesive is bonded to the first limit boss, and is bonded to a portion of a surface of the film sheet that is away from the light guide plate.

According to the backlight module provided by one or more embodiments of the present disclosure, the first direction is perpendicular to the second direction.

At least one of the embodiments of the present disclosure provides a vehicle-mounted display apparatus, including any one of the backlight modules described above.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can obtain other embodiment(s), without any inventive work, which should be within the scope of the present disclosure.

Unless otherwise specified, the technical terms or scientific terms used in the present disclosure should be of general meaning as understood by those ordinarily skilled in the art. In the disclosure, words such as "first", "second" and the like do not denote any order, quantity, or importance, but rather are used for distinguishing different components. Similarly, words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position of the described object is changed, the relative positional relationship may also be correspondingly changed.

As compared with a general display apparatus, a vehicle-mounted display apparatus does not allow abnormal noises caused by vibration. However, a car is exposed to a vibrating environment at all times during driving. At present, a positioning mode of a backlight module in the vehicle-mounted display apparatus is almost always that a limit boss is added to a light guide plate, and meanwhile, a film sheet is fixed to the light guide plate by double-sided adhesive, to achieve an effect of preventing abnormal noises caused by vibration.

Figure 1:
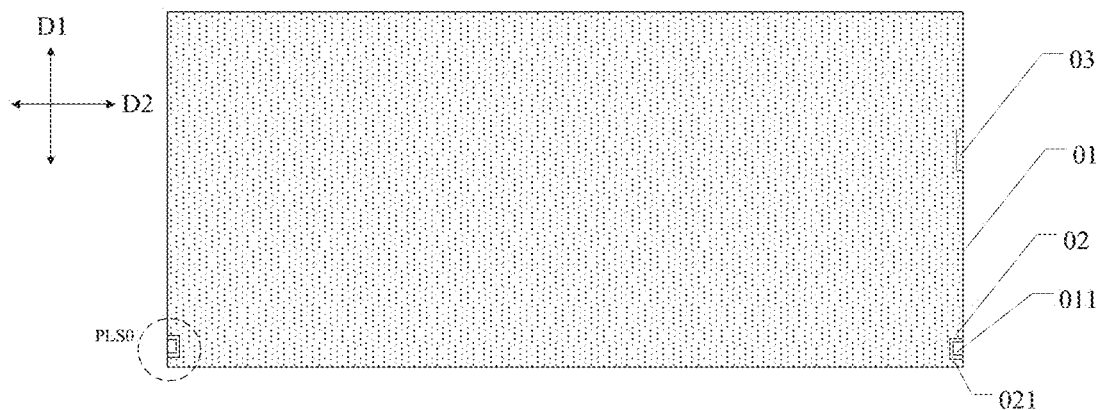
FIG. 1 is a schematic diagram of a backlight module in a vehicle-mounted display apparatus.

FIG. 1 is a schematic diagram of a backlight module in a vehicle-mounted display apparatus. As shown in FIG. 1, the backlight module includes a light guide plate 01 and a film sheet 02. The light guide plate 01 and the film sheet 02 are fixed by double-sided adhesive 03. For example, the light guide plate 01 is configured to lead out light, and the film sheet 02 is configured to optically process the light. FIG. 1 can be a front view of the backlight module.

Figure 2:
FIG. 2 is a schematic diagram of a light guide plate in the backlight module shown in FIG. 1.

FIG. 2 is a schematic diagram of the light guide plate in the backlight module shown in FIG. 1. Referring to FIG. 1 and FIG. 2, the light guide plate 01 includes a limit boss 011; the light guide plate 01 includes a main body portion 012; the main body portion 012 includes a main surface 012s; and the limit boss 011 protrudes out of the light guide plate 01 in a direction perpendicular to the main surface 012s. In FIG. 2, the main surface 012s is within a paper plane; and the limit boss 011 extends in a direction perpendicular to the paper plane. That is, the limit boss 011 protrudes out of the paper plane. FIG. 2 can be a front view of the light guide plate.

Figure 3:
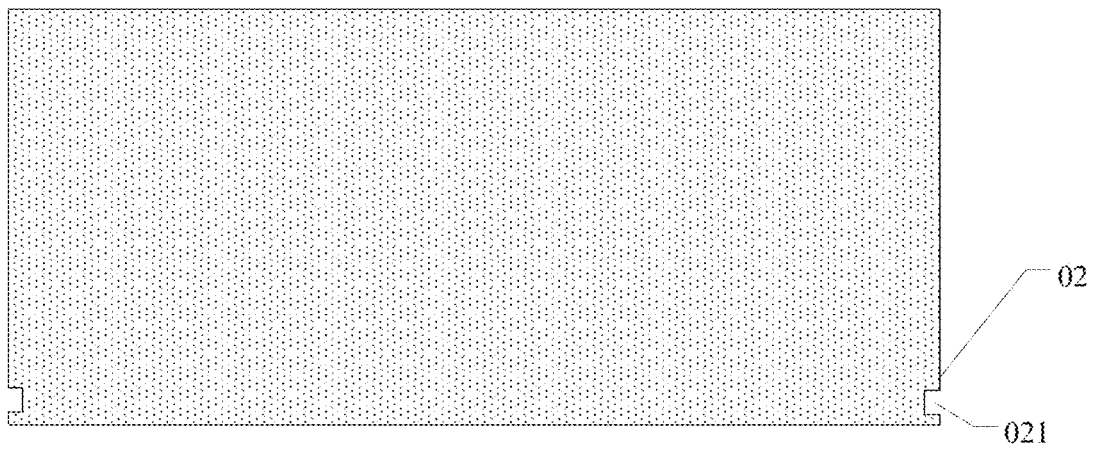
FIG. 3 is a schematic diagram of a film sheet in the backlight module shown in FIG. 1.

FIG. 3 is a schematic diagram of the film sheet in the backlight module shown in FIG. 1. Referring to FIG. 1 and FIG. 3, the film sheet 02 includes a notch 021; and referring to FIG. 1, the limit boss 011 is located inside the notch 021. The notch 021 and the limit boss 011 located therein constitute a limit structure PLS0. FIG. 1 shows two limit structures PLS0. The two limit structures PLS0 are respectively located at a lower left corner and a lower right corner of FIG. 1.

The film sheet is positioned by the limit bosses at the lower left corner and the lower right corner, and is fixed to the light guide plate by double-sided adhesive. In this way, it can be ensured that the film sheet does not sway in the module to avoid occurrence of abnormal noises.

However, the backlight module of such a structure has disadvantages below. Firstly, an assembling process is more complicated, with additional processes of assembling the double-sided adhesive and the light guide plate, and assembling the double-sided adhesive and the film sheet. Secondly, a raw material is added with double-sided adhesive, increasing costs of the backlight. Thirdly, the double-sided adhesive has a risk of falling off. Finally, in each limit structure PLS0, the limit boss 011 limits a position of the film sheet 02 in both a first direction D1 and a second direction D2, and a distance between the limit boss 011 and the film sheet 02 in the first direction D1 is substantially equal to a distance between the limit boss 011 and the film sheet 02 in the second direction D2, thus failing to reserve enough expansion space for the film sheet, which easily causes film sheet to wrinkle, and affects display quality.

Figure 4:
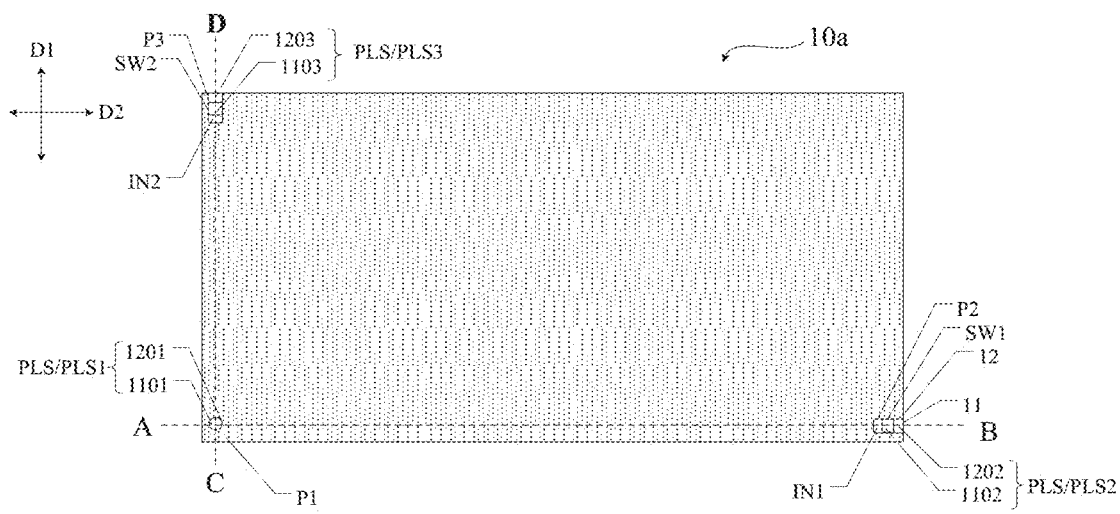
FIG. 4 is a schematic diagram of a backlight module provided by an embodiment of the present disclosure.

FIG. 4 is a schematic diagram of a backlight module provided by an embodiment of the present disclosure. As shown in FIG. 4, the backlight module 10a includes: a light guide plate 11 and a film sheet 12. FIG. 4 can be a front view of the backlight module.

Figure 5:
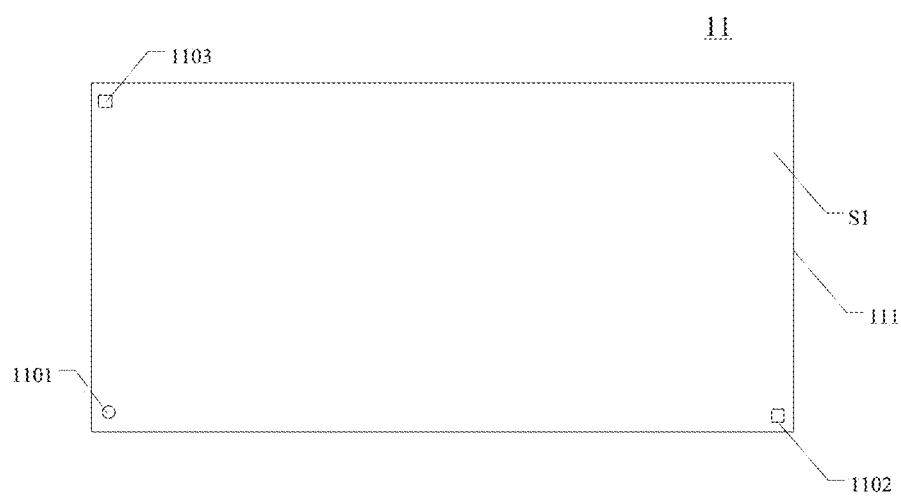
FIG. 5 is a schematic diagram of a light guide plate in the backlight module provided by the embodiment of the present disclosure.

FIG. 5 is a schematic diagram of the light guide plate in the backlight module provided by the embodiment of the present disclosure. Referring to FIG. 4 and FIG. 5, the light guide plate 11 includes a main body portion 111; the main body portion 111 includes a main surface S1; and the light guide plate 11 further includes a first limit boss 1101, a second limit boss 1102 and a third limit boss 1103 that are located on a side of the main body portion 111 on which the main surface S1 is located. For example, the main surface S1 is a light emergent surface. In FIG. 5, the main surface S1 is within a paper plane; and the first limit boss 1101, the second limit boss 1102 and the third limit boss 1103 all extend in a direction perpendicular to the paper plane. FIG. 5 can be a front view of the light guide plate.

Figure 6:
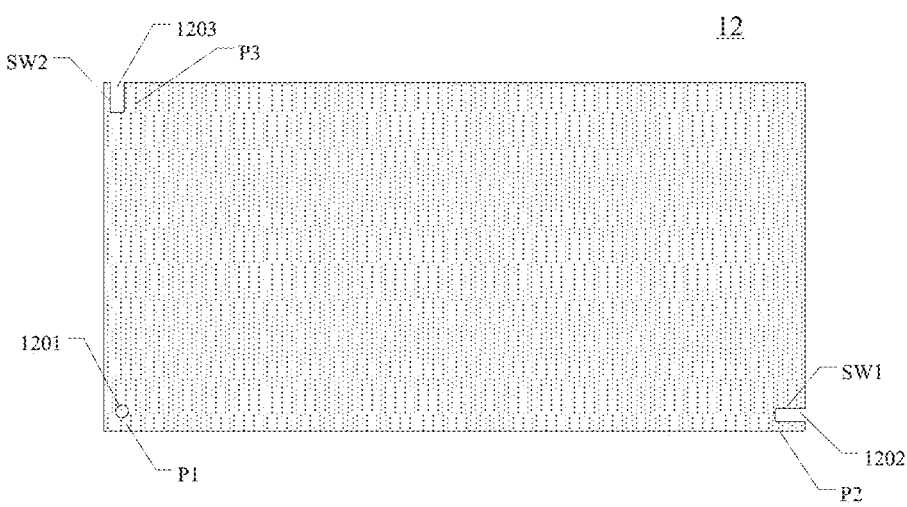
FIG. 6 is a schematic diagram of a film sheet in the backlight module provided by the embodiment of the present disclosure.

FIG. 6 is a schematic diagram of the film sheet in the backlight module provided by the embodiment of the present disclosure. Referring to FIG. 4 and FIG. 6, the film sheet 12 includes a first opening 1201, a second opening 1202, and a third opening 1203. Referring to FIG. 4, the first limit boss 1101 is located within the first opening 1201; the second limit boss 1102 is located within the second opening 1202, and the third limit boss 1103 is located within the third opening 1203.

With further reference to FIG. 4, the first limit boss 1101 limits a position of the film sheet 12 in the first direction D1 and the second direction D2; the second limit boss 1102 limits the position of the film sheet 12 in one of the first direction D1 and the second direction D2; and the third limit boss 1103 limits the position of the film sheet 12 in the other of the first direction D1 and the second direction D2. The first direction D1 intersects with the second direction D2. For example, the first direction D1 is perpendicular to the second direction D2. The embodiment shown in FIG. 4 is described by taking that the first direction D1 is perpendicular to the second direction D2. For example, the first direction D1 is an up-down direction, and the second direction D2 is a left-right direction, but they are not limited thereto. The embodiments of the present disclosure are all described by taking that the first direction D1 is perpendicular to the second direction D2.

FIG. 4 shows three limit structures PLS, namely, a first limit structure PLS1, a second limit structure PLS2 and a third limit structure PLS3. The first limit structure PLS1 includes the first limit boss 1101 and the first opening 1201; the second limit structure PLS2 includes the second limit boss 1102 and the second opening 1202; and the third limit structure PLS3 includes the third limit boss 1103 and the third opening 1203. As shown in FIG. 4, the first limit structure PLS1 limits the position of the film sheet 12 in the first direction D1 and the second direction D2; the second limit structure PLS2 limits the position of the film sheet 12 in the first direction D1; and the third limit structure PLS3 limits the position of the film sheet 12 in the second direction D2.

The backlight module provided by the embodiment of the present disclosure is completely positioned by the limit bosses to solve the problems of abnormal noises as well as film sheet positioning and assembling, without double-sided adhesive, which saves a process of attaching double-sided adhesive as well as material cost, avoids the risk that the double-sided adhesive falls off, and simplifies the assembling process.

Figure 7:
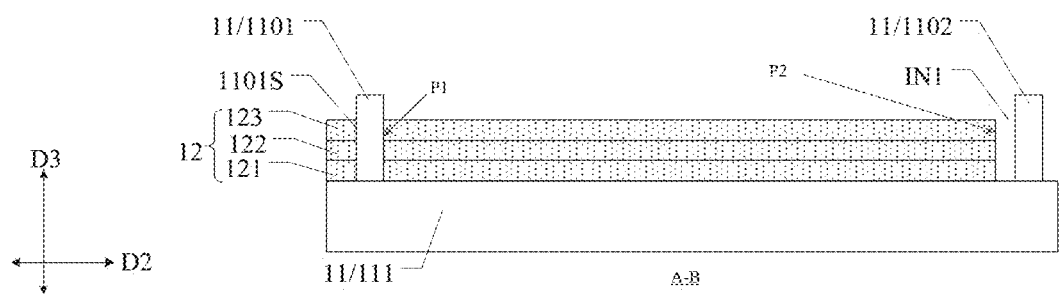
FIG. 7 is a cross-sectional view taken along a dotted line A-B in FIG. 4.

FIG. 7 is a cross-sectional view taken along a dotted line A-B in FIG. 4. Referring to FIG. 4 and FIG. 7, an outer surface 1101S of the first limit boss 1101 is in contact with a portion P1 of the film sheet 12 that forms the first opening 1201 in both the first direction D1 and the second direction D2. As shown in FIG. 4, the outer surface 1101S of the first limit boss 1101 and the portion P1 of the film sheet 12 that forms the first opening 1201 are in contact with each other in respective positions. Of course, in other embodiments of the present disclosure, a gap within a tolerance range may also be formed between the outer surface 1101S of the first limit boss 1101 and the portion P1 of the film sheet 12 that forms the first opening 1201. For example, the gap is less than or equal to 0.15 mm. Further, for example, the gap is less than or equal to 0.1 mm.

The first limit structure PLS1 completely limits the position, and plays a main positioning role. The second limit structure PLS2 plays an auxiliary positioning role. The third limit structure PLS3 plays an auxiliary positioning role.

For example, with further reference to FIG. 4, the second limit boss 1102 limits the position of the film sheet 12 in the first direction D1; and a size of the second opening 1202 in the second direction D2 is greater than a size of the second limit boss 1102 in the second direction D2.

For example, referring to FIG. 4 and FIG. 7, a portion P2 of the film sheet 12 that forms the second opening 1202 includes two first sidewalls SW1 opposite to each other in the first direction D1; the second limit boss 1102 is in contact with the two first sidewalls SW1 to limit the position in the first direction D1. For example, as shown in FIG. 6, the first sidewall SW1 extends in the second direction D2. In other embodiments of the present disclosure, the second limit boss 1102 may not be in contact with the two first sidewalls SW1; for example, gaps within a tolerance range are between the second limit boss 1102 and the two first sidewalls SW1 respectively. For example, the gap is less than or equal to 0.15 mm. Further, for example, the gap is less than or equal to 0.1 mm.

For example, referring to FIG. 4 and FIG. 7, in the second direction D2, a first interval IN1 is between the portion P2 of the film sheet 12 that forms the second opening 1202 and the second limit boss 1102. Therefore, the second limit structure PLS2 also leaves enough expansion space for the film sheet while the first limit structure PLS1 is used to completely position the film sheet. By leaving expansion space for the film sheet in the second direction D2, wrinkles can be avoided.

Figure 8:
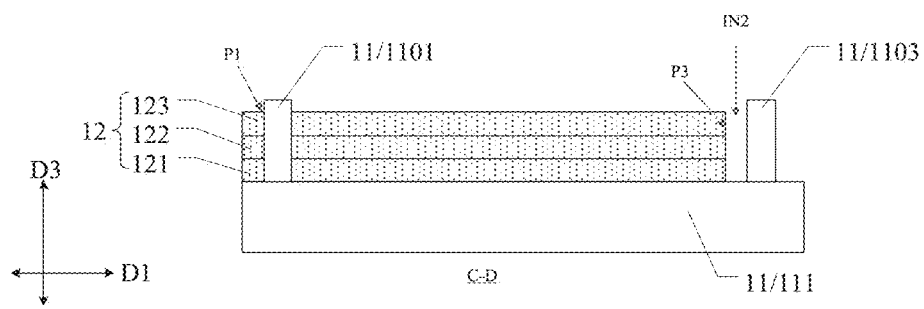
FIG. 8 is a cross-sectional view taken along a dotted line C-D in FIG. 4.

FIG. 8 is a cross-sectional view taken along a dotted line C-D in FIG. 4. Referring to FIG. 4 and FIG. 8, the third limit boss 1103 limits the position of the film sheet 12 in the second direction D2. For example, a portion P3 of the film sheet 12 that forms the third opening 1203 includes two second sidewalls SW2 opposite to each other in the second direction D2; and the third limit boss 1103 is in contact with the two second sidewalls SW2. In other embodiments of the present disclosure, the third limit boss 1103 may not be in contact with the two second sidewalls SW2. For example, gaps within a tolerance range are between the third limit boss 1103 and the two second sidewalls SW2 respectively. For example, the gap is less than or equal to 0.15 mm. Further, for example, the gap is less than or equal to 0.1 mm.

For example, referring to FIG. 4 and FIG. 8, in the first direction D1, a second interval IN2 is between the third limit boss 1103 and the portion P3 of the film sheet 12 that forms the third opening 1203. Therefore, the third limit structure PLS3 also leaves enough expansion space for the film sheet while the first limit structure PLS1 is used to completely position the film sheet. By leaving expansion space for the film sheet in the first direction D1, wrinkles can be avoided.

For example, referring to FIG. 4 and FIG. 7, a size of the first interval IN1 in the second direction D2 is greater than or equal to 0.4 mm. Further, for example, the size of the first interval IN1 in the second direction D2 is greater than or equal to 0.6 mm. Of course, the size of the first interval IN1 in the second direction D2 is not limited thereto, and the size of the first interval IN1 in the second direction D2 can be determined according to a size of a display screen.

For example, referring to FIG. 4 and FIG. 8, a size of the second interval IN2 in the first direction D1 is greater than or equal to 0.4 mm. Further, for example, the size of the second interval IN2 in the first direction D1 is greater than or equal to 0.6 mm. Of course, the size of the second interval IN2 in the first direction D1 is not limited thereto, and the size of the second interval IN2 in the first direction D1 can be determined according to the size of the display screen.

For example, with further reference to FIG. 4, the second limit boss located at a lower right corner completely limits a position in the up-down direction. Under high temperature conditions, the film sheet has enough gap for expansion in the left-right direction, and is less prone to film sheet wrinkles; a straight line formed through the second limit boss and the first limit boss at a lower left corner can be parallel to a side edge of the light guide plate; or the straight line may not be parallel to the side edge of the light guide plate; and the first limit boss and the second limit boss are usually not located in an opening region of a middle frame.

For example, with further reference to FIG. 4, the third limit boss located at an upper left corner completely limits a position in the left-right direction. Under high temperature conditions, the film sheet has enough gap for expansion in the up-down direction, and is less prone to film sheet wrinkles; a straight line formed through the third limit boss and the first limit boss at the lower left corner can be parallel to the side edge of the light guide plate; or the straight line may not be parallel to the side edge of the light guide plate; and the third limit boss is usually not located in an opening region of the middle frame.

For example, as shown in FIG. 4 and FIG. 5, the first limit boss 1101 is located between the second limit boss 1102 and the third limit boss 1103. In the embodiment of the present disclosure, as shown in FIG. 5, the first limit boss 1101, the second limit boss 1102 and the third limit boss 1103 are all provided at an edge position of the main body portion 111, so as not to affect light emergence.

For example, as shown in FIG. 4 and FIG. 5, the second limit boss 1102 and the third limit boss 1103 are located on opposite sides of the light guide plate 11.

For example, one of the first opening 1201, the second opening 1202, and the third opening 1203 is a through hole or a notch. In the backlight module provided by the embodiment shown in FIG. 4, the first opening 1201 is a through hole; and the second opening 1202 and the third opening 1203 are both notches. Of course, in other embodiments, the second opening 1202 and the third opening 1203 may also be set as through holes. In other embodiments, the first opening 1201 may also be set as a notch. For example, the through hole may include a circular hole or a rectangular hole, but is not limited thereto.

For example, the film sheet 12 includes at least three optical film sheets 12. As shown in FIG. 7 and FIG. 8, a size of the first limit boss 1101 in the direction perpendicular to the main body portion 111 is greater than a size of the film sheets 12 in the direction perpendicular to the main body portion 111. As shown in FIG. 7, a size of the second limit boss 1102 in the direction perpendicular to the main body portion 111 is greater than the size of the film sheet 12 in the direction perpendicular to the main body portion 111. As shown in FIG. 8, a size of the third limit boss 1103 in the direction perpendicular to the main body portion 111 is greater than the size of the film sheet 12 in the direction perpendicular to the main body portion 111.

As shown in FIG. 7 and FIG. 8, the film sheet 12 includes a first optical film sheet 121, a second optical film sheet 122 and a third optical film sheet 123. For example, the first optical film sheet 121 is a diffusion sheet; the second optical film sheet 122 is a prism sheet; and the third optical film sheet 123 is a brightness enhancement film. In one embodiment, a size of the main body portion 111 in a third direction D3 is about 2 mm; a size of the first optical film sheet 121 in the third direction D3 is about 0.12 mm; a size of the second optical film sheet 122 in the third direction D3 is about 0.155 mm, and a size of the third optical film sheet 123 in the third direction D3 is about 0.39 mm. Of course, in other embodiments, the main body portion 111, the first optical film sheet 121, the second optical film sheet 122, and the third optical film sheet 123 may also adopt other sizes as needed. The third direction D3 is perpendicular to the first direction D1; and the third direction D3 is perpendicular to the second direction D2. For example, the first direction D1 and the second direction D2 are directions parallel to the main surface S1 of the main body portion 111; and the third direction D3 is a direction perpendicular to the main surface S1 of the main body portion 111.

For example, a height of the first limit boss 1101, a height of the second limit boss 1102, and a height of the third limit boss 1103 are all equal to each other, but they are not limited thereto.

For example, in the embodiment of the present disclosure, a thickness of the main body portion 111 of the light guide plate 11 is greater than a thickness of the film sheets 12.

For example, at least one of the first limit boss 1101, the second limit boss 1102, and the third limit boss 1103 is a cylinder. For example, the first limit boss 1101 is a cylinder, and at least one of the second limit boss 1102 and the third limit boss 1103 is a column having a cross section that resembles a rectangle, but they are not limited thereto.

The above description takes the backlight module shown in FIG. 4 comprising three limit structures as an example. In other embodiments of the present disclosure, on the basis of the backlight module shown in FIG. 4, the second limit structure PLS2 or the third limit structure PLS3 may also be removed. That is, in one embodiment, the backlight module includes a first limit structure PLS1 and a second limit structure PLS2. In another embodiment, the backlight module includes a first limit structure PLS1 and a third limit structure PLS3.

Figure 9A:
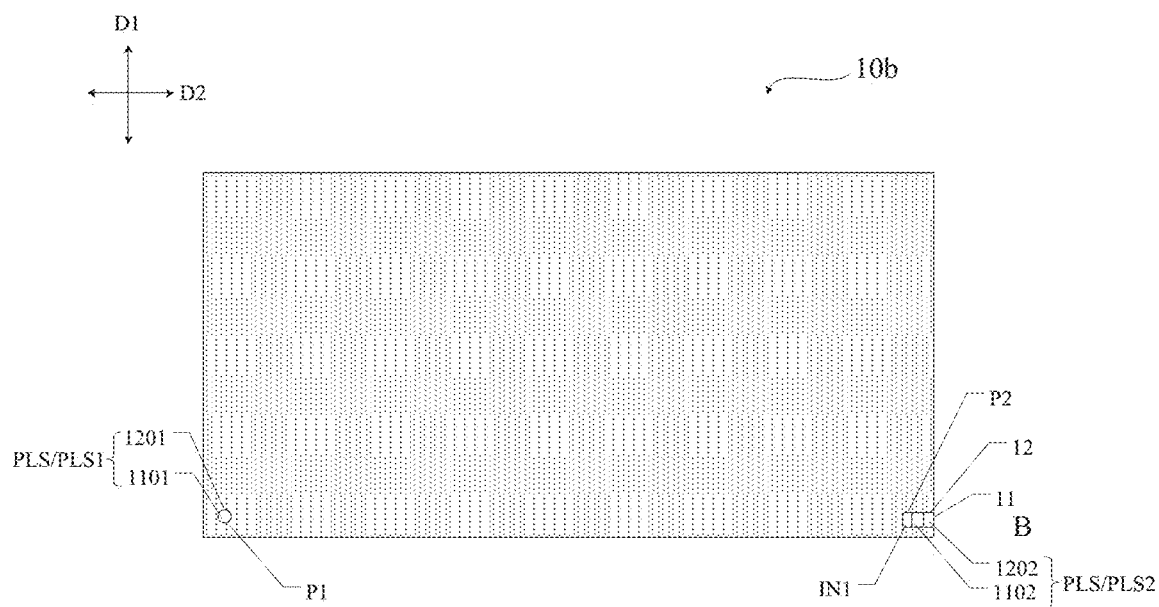
FIG. 9A is a schematic diagram of a backlight module provided by an embodiment of the present disclosure.

FIG. 9A is a schematic diagram of a backlight module provided by an embodiment of the present disclosure. As shown in FIG. 9A, the backlight module 10b includes two limit structures PLS: a first limit structure PLS1 and a second limit structure PLS2. The first limit structure PLS1 and the second limit structure PLS2 are located on a same side edge of a light guide plate 11. As shown in FIG. 9A, the first limit structure PLS1 and the second limit structure PLS2 are located at an edge position of a lower side edge of the light guide plate 11.

Figure 9B:
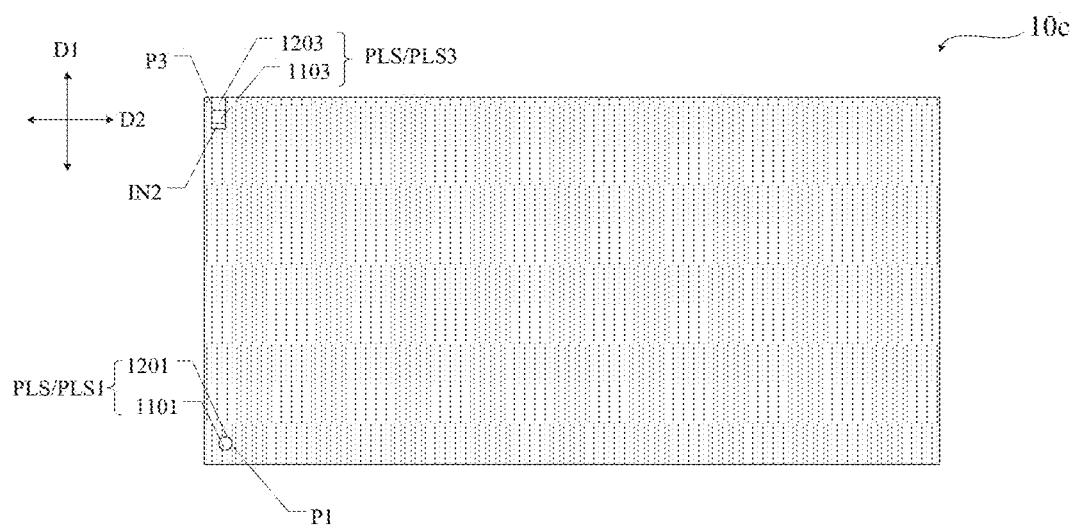
FIG. 9B is a schematic diagram of a backlight module provided by an embodiment of the present disclosure.

FIG. 9B is a schematic diagram of a backlight module provided by an embodiment of the present disclosure. As shown in FIG. 9B, the backlight module 10c includes two limit structures PLS: a first limit structure PLS1 and a third limit structure PLS3. The first limit structure PLS1 and the third limit structure PLS3 are located on a same side edge of a light guide plate 11. As shown in FIG. 9B, the first limit structure PLS1 and the third limit structure PLS3 are located at an edge position of a left side edge of the light guide plate 11.

Figure 10:
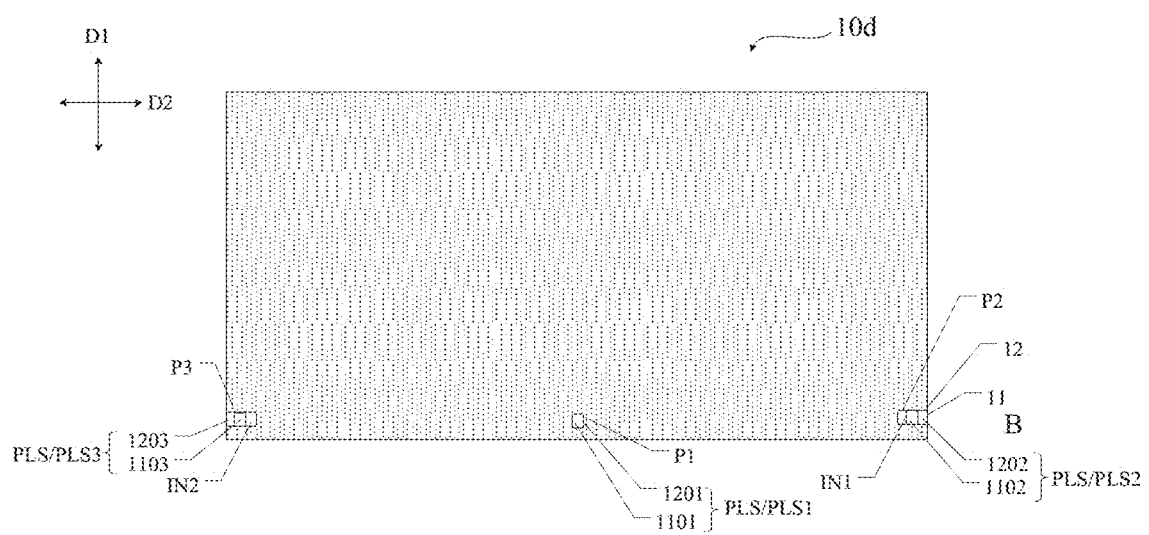
FIG. 10 is a schematic diagram of a backlight module provided by an embodiment of the present disclosure.

FIG. 10 is a schematic diagram of a backlight module provided by an embodiment of the present disclosure. As compared with the backlight module 10a, three limit structures PLS of the backlight module 10d are located on a same side edge of a light guide plate 11. The limit structures PLS are located on the same side edge of the light guide plate 11, which can facilitate narrow frame design of a display apparatus including the backlight module. As shown in FIG. 10, a first limit structure PLS1 is located between a second limit structure PLS2 and a third limit structure PLS3. A first opening 1201 in a form of a through hole in the first limit structure PLS1 in FIG. 10 may also be replaced with a notch.

As shown in FIG. 10, a first limit boss 1101, a second limit boss 1102 and a third limit boss 1103 are located on the same side edge of the light guide plate 11. Correspondingly, the first opening 1201, a second opening 1202 and a third opening 1203 are also located on a same side edge of a film sheet 12. As shown in FIG. 10, the light guide plate 11 has a rectangular shape; and the light guide plate 11 includes an upper side edge, a lower side edge, a left side edge and a right side edge; accordingly, the film sheet 12 also has a rectangular shape, and the film sheet 12 also includes an upper side edge, a lower side edge, a left side edge and a right side edge. As shown in FIG. 10, the light guide plate 11 includes four corners of an upper left corner, an upper right corner, a lower left corner, a lower right corner; and accordingly, the film sheet 12 also includes four corners of an upper left corner, an upper right corner, a lower left corner, a lower right corner. In order not to affect display as far as possible, the limit structures can be provided close to the side edges or the corners of the light guide plate 11 and the film sheet 12.

Figure 11:
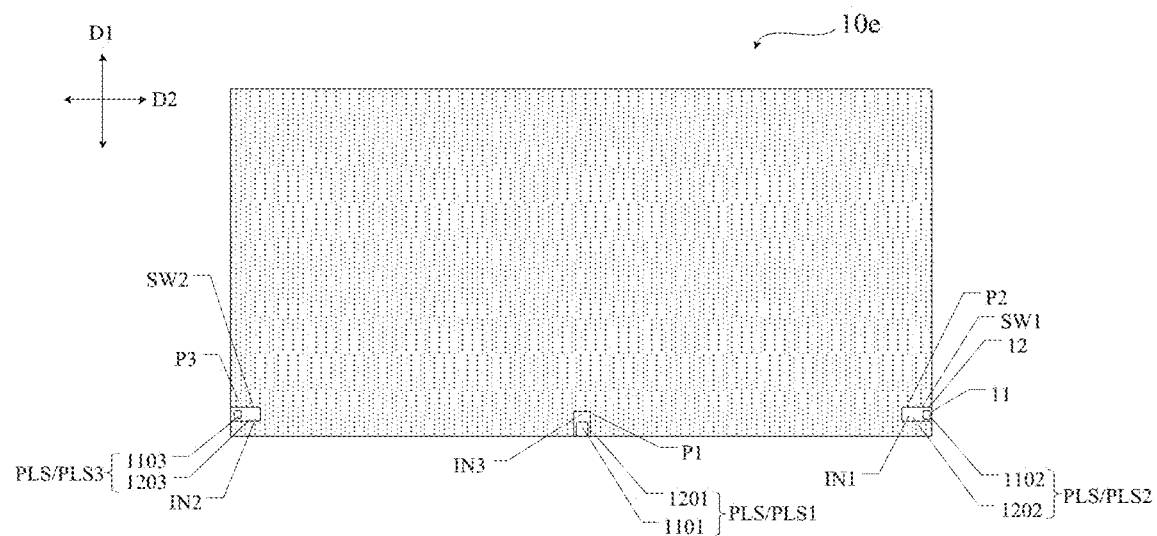
FIG. 11 is a schematic diagram of a backlight module provided by an embodiment of the present disclosure.

FIG. 11 is a schematic diagram of a backlight module provided by an embodiment of the present disclosure. The backlight module 10e shown in FIG. 11 differs from the backlight module 10d shown in FIG. 10 in that: a first opening 1201 in a first limit structure PLS1 is in a form of a notch; and an outer surface of a first limit boss 1101 1101S and a portion P1 of a film sheet 12 that forms the first opening 1201 have a third interval IN3 in a first direction D1.

The backlight module 10e shown in FIG. 11 also differs from the backlight module 10d shown in FIG. 10 in that: in a second limit structure PLS2 in the backlight module 10e, a second limit boss 1102 is not in contact with two first sidewalls SW1 which are opposite to each other in the first direction D1 and included by a portion P2 of the film sheet 12 forming a second opening 1202; and in a third limit structure PLS3 in the backlight module 10e, a third limit boss 1103 is not in contact with the two second sidewalls SW2 which are opposite to each other in the first direction D1 and included in a portion P3 of the film sheet 12 forming a third opening 1203.

Figure 12A:
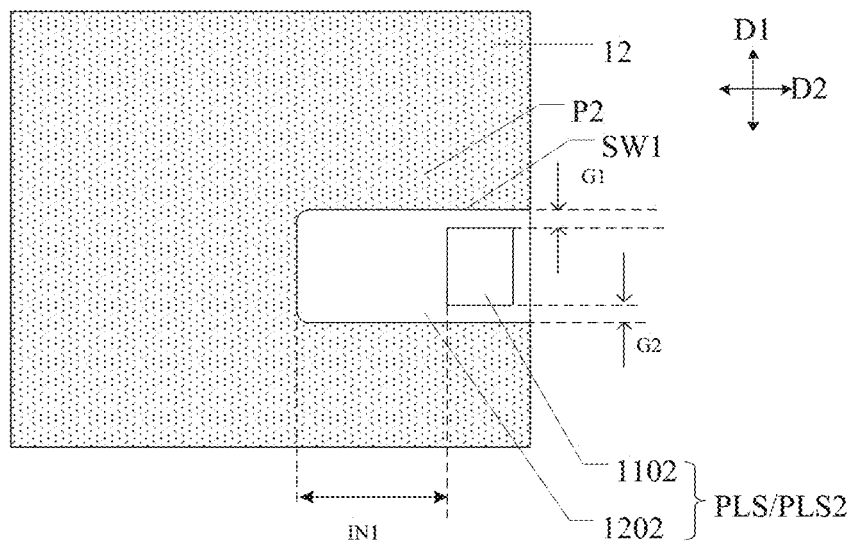
FIG. 12A is a schematic diagram of a second limit structure in the backlight module shown in FIG. 11.

FIG. 12A is a schematic diagram of the second limit structure in the backlight module shown in FIG. 11. Referring to FIG. 11 and FIG. 12A, the portion P2 of the film sheet 12 that forms the second opening 1202 includes two first sidewalls SW1 opposite to each other in the first direction D1; a first gap G1 and a second gap G2 are respectively between the second limit boss 1102 and the two first sidewalls SW1. For example, a first interval IN1 is larger than the first gap G1. For example, the first interval IN1 is larger than the second gap G2. For example, a size of the first interval IN1 in a second direction D2 is greater than a size of the first gap G1 in the first direction D1. For example, the size of the first interval IN1 in the second direction D2 is greater than a size of the second gap G2 in the first direction D1. For example, the first gap G1 is less than or equal to 0.15 mm. The second gap G2 is less than or equal to 0.15 mm. For example, the size of the first interval IN1 in the second direction D2 is at least 2.6 times the size of the first gap G1 in the first direction D1; and the size of the first interval IN1 in the second direction D2 is at least 2.6 times the size of the second gap G2 in the first direction D1. For example, in a case where the first gap G1 and the second gap G2 are not provided, the second limit boss 1102 is in contact with the two first sidewalls SW1. For example, to facilitate assembling and positioning, the size of the first gap G1 in the first direction D1 is greater than zero and less than or equal to 0.15 mm; and the size of the second gap G2 in the first direction D1 is greater than zero and less than or equal to 0.15 mm. For example, the size of the first interval IN1 in the second direction D2 is greater than or equal to 0.4 mm. Further, for example, the size of the first interval IN1 in the second direction D2 is greater than or equal to 0.6 mm. The first interval IN1 leaves enough expansion space for the film sheet. By leaving expansion space for the film sheet in the second direction D2, wrinkles can be avoided. Further, for example, the size of the first gap G1 in the first direction D1 is greater than zero and less than or equal to 0.1 mm; and the size of the second gap G2 in the first direction D1 is greater than zero and less than or equal to 0.1 mm. Further, for example, the size of the first interval IN1 in the second direction D2 is at least 4 times the size of the first gap G1 in the first direction D1; and the size of the first interval IN1 is at least 4 times the size of the second gap G2 in the first direction D1.

For example, in the embodiment of the present disclosure, the first gap G1 and the second gap G2 are respectively between the second limit boss 1102 and the two first sidewalls SW1, which refers to that the first gap G1 and the second gap G2 are between the respective two opposite surfaces of the second limit boss 1102 and the first sidewalls SW1 close thereto, respectively.

Figure 12B:
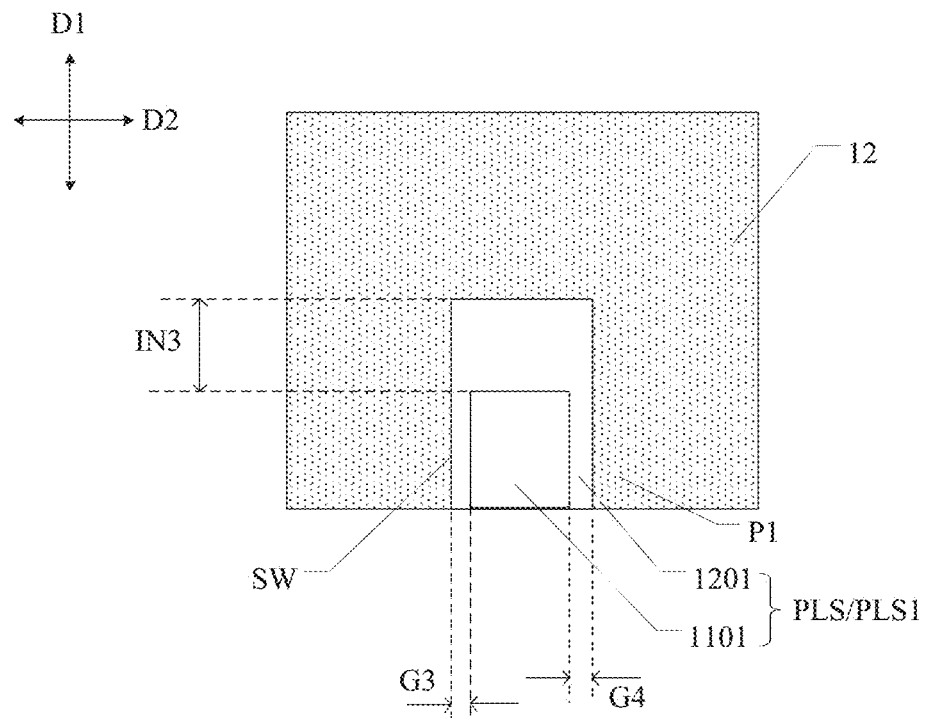
FIG. 12B is a schematic diagram of a first limit structure in the backlight module shown in FIG. 11.

FIG. 12B is a schematic diagram of the first limit structure in the backlight module shown in FIG. 11. Referring to FIG. 11 and FIG. 12B, the portion P1 of the film sheet 12 that forms the first opening 1201 includes two sidewalls SW opposite to each other in the second direction D2; and a third gap G3 and a fourth gap G4 are respectively between the first limit boss 1101 and the sidewalls SW. For example, the third interval IN3 is larger than the third gap G3. For example, the third interval IN3 is larger than the fourth gap G4. For example, a size of the third interval IN3 in the first direction D1 is greater than a size of the third gap G3 in the second direction D2. For example, the size of the third interval IN3 in the first direction D1 is greater than a size of the fourth gap G4 in the second direction D2. For example, the size of the third gap G3 in the second direction D2 is less than or equal to 0.15 mm. The size of the fourth gap G4 in the second direction D2 is less than or equal to 0.15 mm. For example, the size of the third interval IN3 in the first direction D1 is at least 2.6 times the size of the third gap G3 in the second direction D2; and the size of the third interval IN3 in the first direction D1 is at least 2.6 times the size of the fourth gap G4 in the second direction D2. For example, in a case where the third gap G3 and the fourth gap G4 are not provided, the first limit boss 1101 is in contact with the two sidewalls SW. For example, to facilitate assembling and positioning, the size of the third gap G3 in the second direction D2 is greater than zero and less than or equal to 0.15 mm; and the size of the fourth gap G4 in the second direction D2 is greater than zero and less than or equal to 0.15 mm. For example, to facilitate assembling and implementing narrow frame design, the size of the third interval IN3 in the first direction D1 is greater than or equal to 0.4 mm. Further, for example, the size of the third gap G3 in the second direction D2 is less than or equal to 0.1 mm. The size of the fourth gap G4 in the second direction D2 is less than or equal to 0.1 mm. For example, the size of the third interval IN3 in the first direction D1 is at least 4 times the size of the third gap G3 in the second direction D2; and the size of the third interval IN3 in the first direction D1 is at least 4 times the size of the fourth gap G4 in the second direction D2.

For example, in the embodiment of the present disclosure, the third gap G3 and the fourth gap G4 are respectively between the first limit boss 1101 and the sidewalls SW, which refers to that the third gap G3 and the fourth gap G4 are respectively between the respectively two opposite surfaces of the first limit boss 1101 and the sidewalls SW close thereto.

Figure 12C:
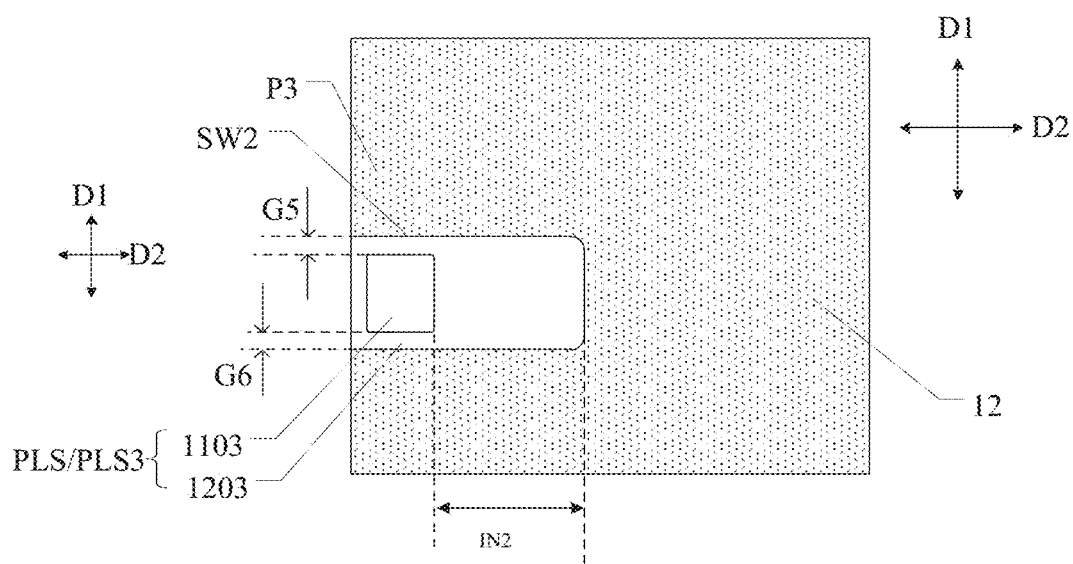
FIG. 12C is a schematic diagram of a third limit structure in the backlight module shown in FIG. 11.

FIG. 12C is a schematic diagram of the third limit structure in the backlight module shown in FIG. 11. Referring to FIG. 11 and FIG. 12C, the portion P3 of the film sheet 12 that forms the third opening 1203 includes two second sidewalls SW2 opposite to each other in the first direction D1; a fifth gap G5 and a sixth gap G6 are respectively between the third limit boss 1103 and the two second sidewalls SW2. For example, a second interval IN2 is larger than the fifth gap G5. For example, the second interval IN2 is larger than the sixth gap G6. For example, a size of the second interval IN2 in the second direction D2 is greater than a size of the fifth gap G5 in the first direction D1. For example, the size of the second interval IN2 in the second direction D2 is greater than a size of the sixth gap G6 in the first direction D1. For example, the size of the fifth gap G5 in the first direction D1 is less than or equal to 0.15 mm. The size of the sixth gap G6 in the first direction D1 is less than or equal to 0.15 mm. For example, the size of the second interval IN2 in the second direction D2 is at least 2.6 times the size of the fifth gap G5 in the first direction D1; and the size of the second interval IN2 in the second direction D2 is at least 2.6 times the size of the sixth gap G6 in the first direction D1. For example, in a case where the fifth gap G5 and the sixth gap G6 are not provided, the third limit boss 1103 is in contact with the two second sidewalls SW2. For example, to facilitate assembling and positioning, the size of the fifth gap G5 in the first direction D1 is greater than zero and less than or equal to 0.15 mm; and the size of the sixth gap G6 in the first direction D1 is greater than zero and less than or equal to 0.15 mm. For example, the size of the second interval IN2 in the second direction D2 is greater than or equal to 0.4 mm. The second interval IN2 leaves enough expansion space for the film sheet. By leaving expansion space for the film sheet in the second direction D2, wrinkles can be avoided. Further, for example, the size of the fifth gap G5 in the first direction D1 is greater than zero and less than or equal to 0.1 mm. The size of the sixth gap G6 in the first direction D1 is greater than zero and less than or equal to 0.1 mm. Further, for example, the size of the second interval IN2 in the second direction D2 is at least 4 times the size of the fifth gap G5 in the first direction D1; and the size of the second interval IN2 in the second direction D2 is at least 4 times the size of the sixth gap G6 in the first direction D1.

For example, in the embodiment of the present disclosure, the fifth gap G5 and the sixth gap G6 are respectively between the third limit boss 1103 and the two second sidewalls SW2, which refers to that the fifth gap G5 and the sixth gap G6 are respectively between the respective two opposite surfaces of the third limit boss 1103 and the second sidewalls SW2 close thereto.

For example, in the third limit structure PLS3 shown in FIG. 4, the third limit boss 1103 may also not be in contact with the two second sidewalls SW2, but form the fifth gap G5 and the sixth gap G6 respectively with the two second sidewalls SW2. For example, a size of the second interval IN2 in the first direction D1 is greater than a size of the fifth gap G5 in the second direction D2. For example, the size of the second interval IN2 in the first direction D1 is greater than a size of the sixth gap G6 in the second direction D2. For example, the size of the fifth gap G5 in the second direction D2 is less than or equal to 0.15 mm. The size of the sixth gap G6 in the second direction D2 is less than or equal to 0.15 mm. For example, the size of the second interval IN2 in the first direction D1 is at least 2.6 times the size of the fifth gap G5 in the second direction D2; and the size of the second interval IN2 in the first direction D1 is at least 2.6 times the size of the sixth gap G6 in the second direction D2. For example, to facilitate assembling and positioning, the size of the fifth gap G5 in the second direction D2 is greater than zero and less than or equal to 0.15 mm; and the size of the sixth gap G6 in the second direction D2 is greater than zero and less than or equal to 0.15 mm. For example, the size of the second interval IN2 in the first direction D1 is greater than or equal to 0.4 mm. The second interval IN2 leaves enough expansion space for the film sheet. By leaving expansion space for the film sheet in the first direction D1, wrinkles can be avoided. Further, for example, the size of the fifth gap G5 in the second direction D2 is less than or equal to 0.1 mm. The size of the sixth gap G6 in the second direction D2 is less than or equal to 0.1 mm. Further, for example, the size of the second interval IN2 in the first direction D1 is at least 4 times the size of the fifth gap G5; and the size of the second interval IN2 in the first direction D1 is at least 4 times the size of the sixth gap G6 in the second direction D2.

Figure 13A:
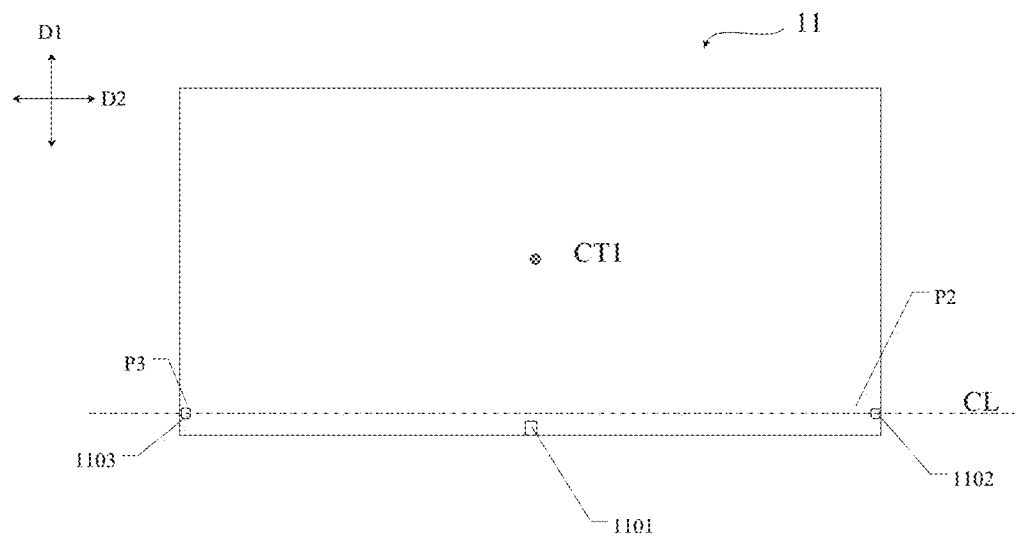
FIG. 13A is a plan view of a light guide plate in the backlight module shown in FIG. 11.

FIG. 13A is a plan view of the light guide plate in the backlight module shown in FIG. 11. As shown in FIG. 13A, in order to implement narrow frame design of the display apparatus comprising the backlight module, the first limit boss 1101 is located on a side of a connecting line CL of centers of the second limit boss 1102 and the third limit boss 1103 that is away from a center CT1 of the light guide plate 11.

Figure 13B:
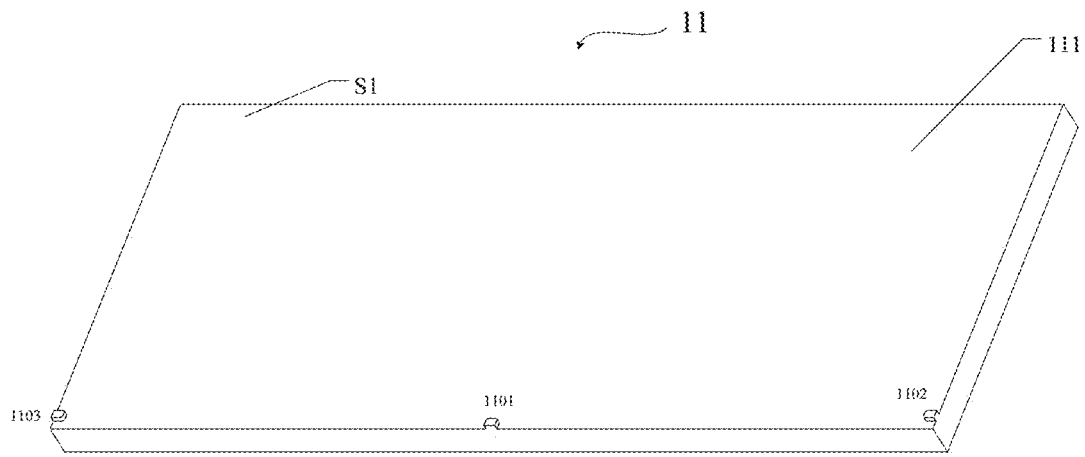
FIG. 13B is a perspective view of the light guide plate in the backlight module shown in FIG. 11.

FIG. 13B is a perspective view of the light guide plate in the backlight module shown in FIG. 11. The light guide plate 11 includes a main body portion 111. As shown in FIG. 13B, the main body portion 111 includes a main surface S1; and the light guide plate 11 further includes a first limit boss 1101, a second limit boss 1102, and a third limit boss 1103 located on a side of the main body portion 111 on which the main surface S1 is located. For example, the main surface S1 is a light emergent surface.

Figure 14:
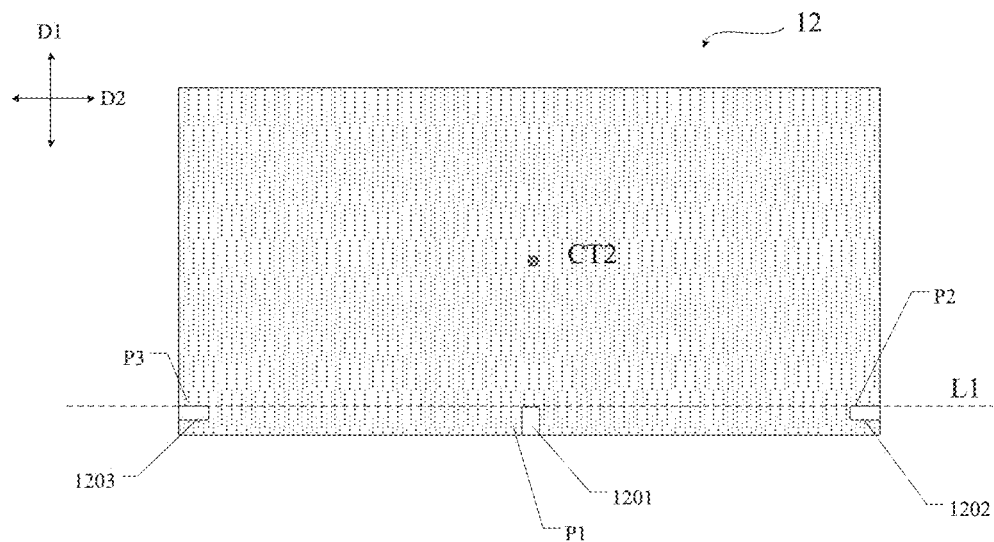
FIG. 14 is a plan view of a film sheet in the backlight module shown in FIG. 11.

FIG. 14 is a plan view of the film sheet in the backlight module shown in FIG. 11. For example, in order to implement narrow frame design of the display apparatus comprising the backlight module, the sidewalls close to a film sheet center CT2 and respectively form the first opening 1201, the second opening 1202, and the third opening 1203 are located on a same straight line L1.

Figure 15:
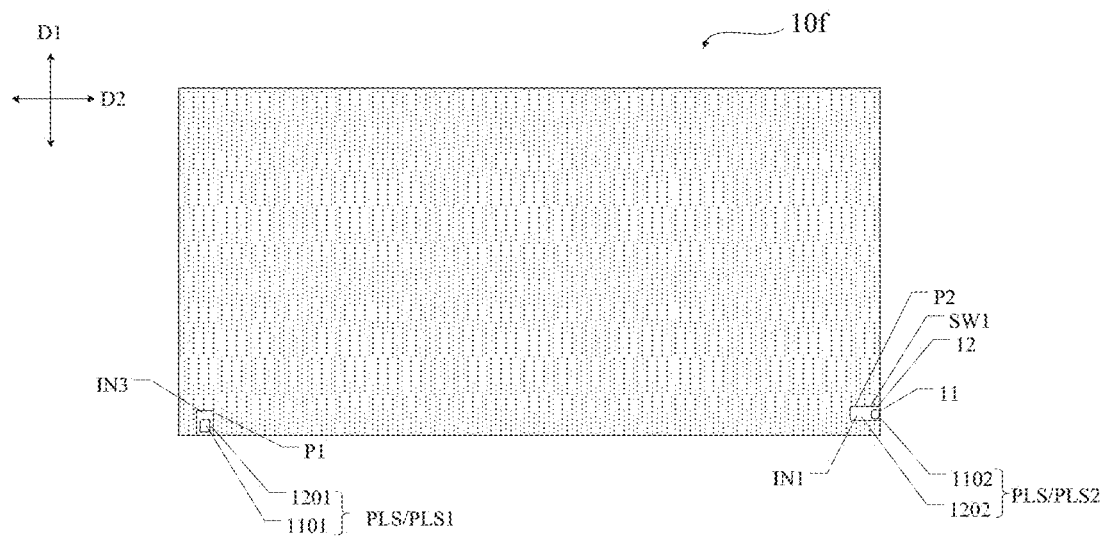
FIG. 15 is a schematic diagram of a backlight module provided by an embodiment of the present disclosure.

FIG. 15 is a schematic diagram of a backlight module provided by an embodiment of the present disclosure. As compared with the backlight module 10e shown in FIG. 11, in the backlight module 10f shown in FIG. 15, a third limit structure is not included, and a position of a first limit structure PLS1 is adjusted to the position of the third limit structure PLS3 provided in the backlight module 10e. That is, as shown in FIG. 15, the backlight module 10f is provided with the first limit structure PLS1 and a second limit structure PLS2. In order to facilitate narrow frame design, the first limit structure PLS1 and the second limit structure PLS2 are located at two corners on a same side edge of a light guide plate.

For example, a first limit boss 1101, a second limit boss 1102, and a third limit boss 1103 each have a size range of about (1.5 to 2) mm×(1.5 to 2) mm, but it is not limited thereto.

In the embodiment of the present disclosure, the first limit boss 1101, the second limit boss 1102 and the third limit boss 1103 can be columns, for example, can be cylinders or rectangular columns, but they are not limited thereto, and can be set as needed.

For example, a minimum size of a portion of a film sheet that forms an opening is 1.5 mm, so as to have enough strength for positioning.

Figure 16:
FIG. 16 is a schematic diagram of a display apparatus provided by an embodiment of the present disclosure.

FIG. 16 is a schematic diagram of a display apparatus provided by an embodiment of the present disclosure. The embodiment of the present disclosure further provides a display apparatus, comprising a backlight module 10 and a display screen 30. On a side of the backlight module 10 that is away from the display screen 30, a reflective sheet can be further provided to improve light efficiency. The backlight module 10 can be any one of the above-described backlight modules. For example, the backlight module 10 can be any one of the backlight module 10a, the backlight module 10b, the backlight module 10c, the backlight module 10d, the backlight module 10e, and the backlight module 10f.

Figure 17:
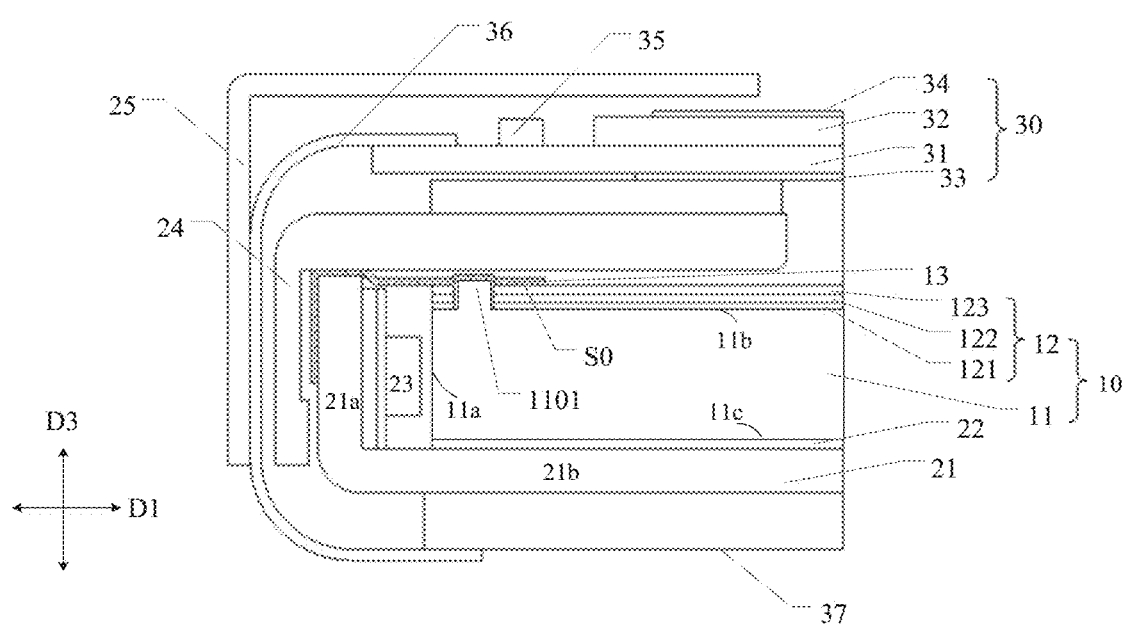
FIG. 17 is a partial schematic diagram of the display apparatus provided by the embodiment of the present disclosure.

FIG. 17 is a partial schematic diagram of the display apparatus provided by the embodiment of the present disclosure. As shown in FIG. 17, in order to further fix the light guide plate 11 and the film sheet 12, single-sided adhesive 13 can be provided; the single-sided adhesive 13 is bonded to a first limit boss 1101 and is bonded to a portion of a surface S0 of a film sheet 12 that is away from a light guide plate 11. For example, the single-sided adhesive 13 is also bonded to a portion of a main body portion that is close to the first limit boss 1101 so as to improve a fixing effect, but it is not limited thereto. As shown in FIG. 17, the display apparatus further includes a backplane 21; and the single-sided adhesive 13 can be further bonded to the backplane 21; of course, the single-sided adhesive 13 may not be bonded to the backplane 21. Of course, in the embodiment of the present disclosure, the single-sided adhesive 13 may not be provided; and positioning of the light guide plate and the film sheet in a first direction D1, a second direction D2 and a third direction D3 can be implemented through cooperation of limit structures and a plastic frame.

As shown in FIG. 17, the display apparatus further includes a reflective sheet 22, a light source 23, a plastic frame 24, and a front frame 25. The reflective sheet 22 is located between the backplane 21 and the light guide plate 11; and the light source 23 is located on a side face of the light guide plate 11 to constitute a light source of a side-lit type. For example, the light source 23 may have a bar shape and can be arranged along one or more side faces of the light guide plate 11. For example, the light guide plate 11 according to the embodiment of the present disclosure includes an upper side face, a lower side face, a left side face and a right side face. The plastic frame 24 functions to support the display screen 30 and fix edges of the light guide plate 11 and the film sheet 12. As shown in FIG. 17, the display screen 30 includes a first substrate 31, a second substrate 32, a first polarizer 33 and a second polarizer 34. The first substrate 31 and the second substrate 32 are provided opposite to each other and cell-assembled, and a liquid crystal layer is provided in the cell (not shown in FIG. 17). As shown in FIG. 17, the display apparatus further includes an integrated circuit 35, a flexible printed circuit board 36 and a printed circuit board 37. The integrated circuit 35 is located on the first substrate 31; the flexible printed circuit board 36 has one end coupled to the first substrate 31, and the other end coupled to the printed circuit board 37. The printed circuit board 37 is located on a side of the backplane 21 opposite to a side on which the light guide plate 11 is provided.

As shown in FIG. 17, the backplane 21 includes a portion 21a facing a light incident surface 11a of the light guide plate 11 and a portion 21b facing an opposite side 11c of the light emergent surface 11b of the light guide plate 11; the single-sided adhesive 13 is bonded to the portion 21a of the backplane 21 that faces the light incident surface 11a of the light guide plate 11. For example, a material of the backplane includes metal, but is not limited thereto.

When the display apparatus adopts the backlight module 10d, the backlight module 10e, and the backlight module 10f, a display apparatus whose three sides (an upper side, a left side, and a right side) are all narrow frames can be formed.

As shown in FIG. 17, a side of the display screen 30 on which the integrated circuit and the flexible printed circuit board 36 are provided corresponds to a side of the light guide plate on which the first limit boss 1101 is provided, so as to facilitate implementing a narrow frame.

For example, the display apparatus includes a vehicle-mounted display apparatus. The vehicle-mounted display apparatus is a liquid crystal display apparatus.

It should be noted that, for clarity, in the drawings used to describe the embodiments of the present disclosure, thickness of a layer or a region is exaggerated. It can be understood that when an element such as a layer, film, region or substrate is referred to as being "on" or "under" another element, the element can be directly "on" or "directly under" the other element, or with possible intermediate element therebetween.

The above are only specific implementations of the present disclosure, but the protection scope of the present disclosure is not limited thereto. Changes or substitutions that one skilled in the art can easily think of within the technical scope disclosed in the present disclosure falls within the protection scope of the present disclosure. Therefore, the protection scope of the present disclosure should be subject to the protection scope of the claims.

The invention claimed is:

1. A backlight module, comprising:
a film sheet, including a first opening and a second opening; and
a light guide plate, including a main body portion, the main body portion including a main surface,
wherein, the light guide plate further includes a first limit boss and a second limit boss located on a side of the main body portion on which the main surface is located; the first limit boss is located within the first opening; and the second limit boss is located within the second opening,
the second limit boss limits a position of the film sheet in a first direction; the first limit boss limits the position of the film sheet in a second direction; the first direction and the second direction are both directions parallel to the main surface; and the first direction intersects with the second direction,
in the second direction, a first interval is between a portion of the film sheet that forms the second opening and the second limit boss; and the portion of the film sheet that forms the second opening includes two first sidewalls opposite to each other in the first direction; and
a first gap and a second gap are respectively between the second limit boss and the two first sidewalls; a size of the first interval in the second direction is greater than a size of the first gap in the first direction; the size of the first interval in the second direction is greater than a size of the second gap in the first direction; or the second limit boss is in contact with the two first sidewalls.

2. The backlight module according to claim 1, wherein, in the first direction, an interval is between a portion of the film sheet that forms the first opening and the first limit boss; and the portion of the film sheet that forms the first opening includes two sidewalls opposite to each other in the second direction, and
a third gap and a fourth gap are respectively between the first limit boss and the two sidewalls; a size of the interval in the first direction is greater than a size of the third gap in the second direction; the size of the interval in the first direction is greater than a size of the fourth gap in the second direction; or, the first limit boss is in contact with the two sidewalls.

3. The backlight module according to claim 2, wherein, the size of the interval in the first direction is at least 2.6 times the size of the third gap in the second direction; and the size of the interval in the first direction is at least 2.6 times the size of the fourth gap in the second direction;
the size of the first interval in the second direction is at least 2.6 times the size of the first gap in the first direction; and the size of the first interval in the second direction is at least 2.6 times the size of the second gap in the first direction.

4. The backlight module according to claim 3, wherein, the size of the first gap in the first direction is less than or equal to 0.15 mm; the size of the second gap in the first direction is less than or equal to 0.15 mm; and the size of the first interval in the second direction is greater than or equal to 0.4 mm;
the size of the third gap in the second direction is less than or equal to 0.15 mm; the size of the fourth gap in the second direction is less than or equal to 0.15 mm; and the size of the interval in the first direction is greater than or equal to 0.4 mm.

5. The backlight module according to claim 1, wherein, an outer surface of the first limit boss is in contact with the portion of the film sheet that forms the first opening in at least one of the first direction and the second direction.

6. The backlight module according to claim 1, wherein, the light guide plate further includes a third limit boss located on the side of the main body portion on which the main surface is located; the film sheet further includes a third opening; the third limit boss is located within the third opening; and the third limit boss limits the position of the film sheet in the second direction,
in the first direction, a second interval is between a portion of the film sheet that forms the third opening and the third limit boss; and the portion of the film sheet that forms the third opening includes two second sidewalls opposite to each other in the second direction, and
a fifth gap and a sixth gap are respectively between the third limit boss and the two second sidewalls; a size of the second interval in the first direction is greater than a size of the fifth gap in the second direction; the size of the second interval in the first direction is greater than a size of the sixth gap in the second direction; or, the third limit boss is in contact with the two second sidewalls.

7. The backlight module according to claim 6, wherein, the size of the second interval in the first direction is at least 2.6 times the size of the fifth gap in the second direction; and the size of the second interval in the first direction is at least 2.6 times the size of the sixth gap in the second direction.

8. The backlight module according to claim 7, wherein, the size of the fifth gap in the second direction is less than or equal to 0.15 mm; the size of the sixth gap in the second direction is less than or equal to 0.15 mm; and the size of the second interval in the first direction is greater than or equal to 0.4 mm.

9. The backlight module according to claim 1, wherein, the light guide plate further includes a third limit boss located on the side of the main body portion on which the main surface is located; the film sheet further includes a third opening; the third limit boss is located within the third opening; and the third limit boss limits the position of the film sheet in the first direction;
in the second direction, a second interval is between a portion of the film sheet that forms the third opening and the third limit boss; the portion of the film sheet that forms the third opening includes two second sidewalls opposite to each other in the first direction, and
a fifth gap and a sixth gap are respectively between the third limit boss and the two second sidewalls; a size of the second interval in the second direction is greater than a size of the fifth gap in the first direction; and the size of the second interval in the second direction is greater than a size of the sixth gap in the first direction.

10. The backlight module according to claim 9, wherein, the size of the second interval in the second direction is at least 2.6 times the size of the fifth gap in the first direction; and the size of the second interval in the second direction is at least 2.6 times the size of the sixth gap in the first direction.

11. The backlight module according to claim 10, wherein, the size of the fifth gap in the first direction is less than or equal to 0.15 mm; the size of the sixth gap in the first direction is less than or equal to 0.15 mm; and the size of the second interval in the second direction is greater than or equal to 0.4 mm.

12. The backlight module according to claim 6, wherein, the first limit boss, the second limit boss, and the third limit boss are located on a same side edge of the light guide plate.

13. The backlight module according to claim 12, wherein, the first limit boss is located between the second limit boss and the third limit boss; and the first limit boss is located on a side of connecting line of centers of the second limit boss and the third limit boss that is away from a center of the light guide plate.

14. The backlight module according to claim 6, wherein, one of the first opening, the second opening, and the third opening is a through hole or a notch.

15. The backlight module according to claim 1, further comprising a single-sided adhesive, wherein, the single-sided adhesive is bonded to the first limit boss, and is bonded to a portion of a surface of the film sheet that is away from the light guide plate.

16. The backlight module according to claim 1, wherein, the first direction is perpendicular to the second direction.

17. A vehicle-mounted display apparatus, comprising a backlight module, the backlight module comprising:
a film sheet, including a first opening and a second opening; and
a light guide plate, including a main body portion, the main body portion including a main surface,
wherein, the light guide plate further includes a first limit boss and a second limit boss located on a side of the main body portion on which the main surface is located; the first limit boss is located within the first opening; and the second limit boss is located within the second opening,
the second limit boss limits a position of the film sheet in a first direction; the first limit boss limits the position of the film sheet in a second direction; the first direction and the second direction are both directions parallel to the main surface; and the first direction intersects with the second direction,
in the second direction, a first interval is between a portion of the film sheet that forms the second opening and the second limit boss; and the portion of the film sheet that forms the second opening includes two first sidewalls opposite to each other in the first direction; and
a first gap and a second gap are respectively between the second limit boss and the two first sidewalls; a size of the first interval in the second direction is greater than a size of the first gap in the first direction; the size of the first interval in the second direction is greater than a size of the second gap in the first direction; or the second limit boss is in contact with the two first sidewalls.

18. The vehicle-mounted display apparatus according to claim 17, further comprising single-sided adhesive, wherein, the single-sided adhesive is bonded to the first limit boss, and is bonded to a portion of a surface of the film sheet that is away from the light guide plate.

19. The vehicle-mounted display apparatus according to claim 18, wherein, the single-sided adhesive is also bonded to a portion of a main body portion that is close to the first limit boss.

20. The vehicle-mounted display apparatus according to claim 19, further comprising a backplane, wherein, the single-sided adhesive is also bonded to the backplane.

* * * * *